United States Patent Office 3,160,672
Patented Dec. 8, 1964

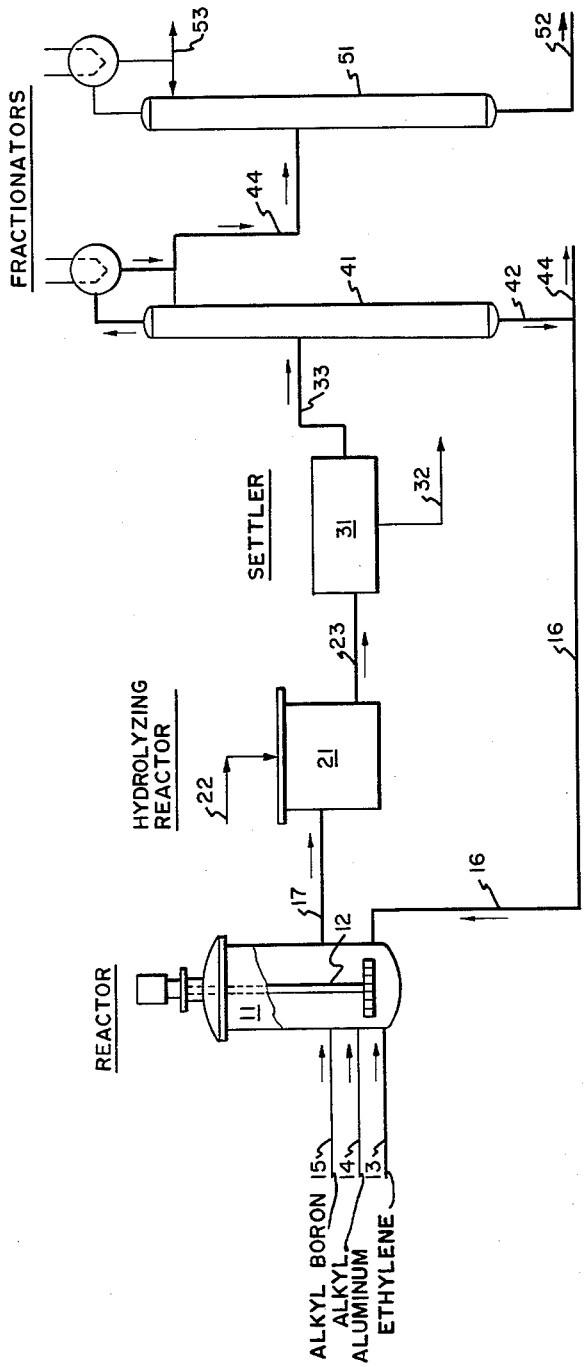

3,160,672
ETHYLENE POLYMERIZATION WITH A TRI-
ALKYL BORON - TRIALKYL ALUMINUM
CATALYST
Tillmon H. Pearson and John K. Presswood, Baton Rouge,
La., assignors to Ethyl Corporation, New York, N.Y., a
corporation of Virginia
Filed Nov. 29, 1960, Ser. No. 72,356
5 Claims. (Cl. 260—683.15)

This invention relates to the production of olefin hydrocarbons. More specifically, the invention relates to a new and improved process for converting ethylene to normally liquid or low melting solid olefin hydrocarbon products, and even more particularly, monoolefins of the alpha type, that is, 1-alkene hydrocarbons. Further, the invention comprises a process for making these 1-alkene components having a predominance of straight, or unbranched chain, constituents, these components being referred to herein as vinyl olefins.

Olefinic hydrocarbons in the range of about eight and higher carbon atoms are of course well known chemicals and have long been available for scientific purposes. However, the availability of relatively pure cuts of normal alpha-olefins, or vinyl olefins, has been such that these materials have not received extremely wide commercial usage. Although fractions are available from petroleum hydrocarbon streams corresponding to these in molecular weight, such fractions include numerous isomeric components which are branched or which have "internal" unsaturation, or which, although alpha olefins, nevertheless have alkyl branching from the second or beta carbon atom. Such branched alpha olefins are referred to herein as vinylidene olefins. Hence, liquid petroleum sources are not efficient sources of straight chain olefins.

The straight chain alpha olefins of moderate chain length, that is, from 8 to about 20 carbon atoms have high potential utility as starting materials for detergents, plasticizer chemicals for use in vinyl synthetic resins, as starting materials for the generation of monohydric alcohols, and for various other desirable organic chemical products. Further, because of the increasing scarcity of certain natural materials hitherto readily available for some of these end products, the potential usage of such olefins is expanding. A particularly desirable fraction is a mixture of vinyl olefins having from 12 to 16 carbon atoms. Fractions of mixtures of olefin hydrocarbons are referred to herein according to the number of carbon atoms in the constituents therein, the above type of fraction being identified as a $C_{12-16}$ fraction.

It has heretofore been known that olefin hydrocarbons can be generated from ethylene by polymerization in the presence of certain organometallic activators. In particular, the process disclosed by Ziegler and Gellert, in U.S. Patent 2,699,457, shows that ethylene, a readily available chemical material, can be polymerized to produce olefinic hydrocarbons. However, if an attempt is made to get a high degree of production by that process, relative to the organometallic activator employed, the process tends to form solid polymers, rather than the desired vinyl olefins. Further, the rate of reaction as shown by the examples of said patent, and by repetition of said examples, is relatively low, so that this type of process has not been effectively or commercially used. In addition, as will be shown in more detail hereinafter, the process of the Ziegler patent above referred to results in a product with a high degree of vinylidene olefins which are not acceptable for many of the ultimate purposes indicated above. In fact, it appears that the products obtained include as much as 95 mole percent of branched or vinylidene type olefins or internal olefins. These materials are not particularly marketable.

Further disclosure by Ziegler, Wilke, and Holzkamp, in U.S. Patent 2,781,410, discloses the combination of ethylene polymerization employing organometallic activators such as triethyl aluminum, and also additives which are selected from the metals nickel, cobalt, or platinum. These two types of materials can be used in a single step or a two step process for producing olefin hydrocarbons from ethylene. In the two stage type of process a stoichiometric chain growth operation is conducted in which ethylene is added to aluminum alkyls in multiples until the desired average chain length of alkyl group on the aluminum alkyl is achieved, and thereafter said alkyl is displaced from the aluminum alkyl by the effect of further ethylene gas and in the presence of minor quantities of one of the metals indicated above. The difficulties of this operation are, with respect to the two stage operation, similar to the first described Ziegler process mentioned above. When it is attempted to carry out the two operations in a single stage, it is found that, as a practical matter, olefins greater than having four carbon atoms can not be achieved.

A significant need thus exists for a truly catalytic process which is capable of generating, from ethylene, a substantial output of product olefins for a given quantity of catalyst. Further, a need exists for a process capable of converting ethylene into olefins predominating in, or having a desired proportion of, vinyl alpha olefins.

An object of the present invention, then, is to provide a new and improved process for catalytically converting ethylene to alpha olefins predominating in liquid and low melting solid components of up to, typically 24 to 30 carbon atoms. A more particular object is to provide a catalytic process for the controlled conversion of ethylene into alpha olefins having a desired, and usually prependant, proportion of vinyl tpye alpha olefins. A further specific object of certain highly preferred embodiments, is to provide a catalytic process whereby ethylene is converted into alpha olefins predominating in vinyl olefins and further having controlled lower proportions of the higher molecular weight components, i.e., olefins of 18 or more carbon atoms. A further particular objective of certain highly preferred objects is to provide a novel and improved process wherein ethylene is converted to desirable olefins and the reaction products are further treated for recovery purposes in a unique manneer. Yet another object is to provide a new and improved process which is directable to a degree not heretofore encountered, i.e., the distribution of product olefins can be adjusted to a greater degree than heretofore feasible, without altering the chemical characteristics of the product compounds. A particular additional object of certain embodiments is to convert ethylene into olefinic products having a high proportion of a fraction of 12 to 16 carbon atom alpha olefins predominating in vinyl components.

The process of the present invention is characterized in all embodiments by subjecting ethylene to controlled reaction in the presence of a catalyst system consisting essentially of a hydrocarbon compound of boron plus a hydrocarbon compound of aluminum. The specific identities of these catalyst components are not critical; in fact the average compositions of the catalyst components normally change with reaction time in cyclic operations. The preferred components are trialkyl boron compounds and trialkyl aluminum compounds. In general, however, what is meant by a hydrocarbon compound of boron or aluminum is a compound of boron, or of aluminum, respectively, having only hydrocarbon radicals attached thereto. It will be understood that compounds readily converted to such components, particularly under the process conditions, are to be considered as equivalents, as will be illustrated hereinafter. Further, the presence of the boron or aluminum constituent, as a complex with a more strongly electropositive metal component, is permissive, but undesirable, generally. In all instances, the respective aluminum and boron components should contain at least two hydrocarbon radicals in the molecule.

The proportions of the hydrocarbon boron compound and the hydrocarbon aluminum compound are highly flexible, good results having been obtained in proportions of from as low as one-fourth mole of hydrocarbon boron constituent per mole of hydrocarbon aluminum constituent up to as high as 10 moles per mole. When a low relative proportion of the boron constituent used, it is found preferable to also provide an inert hydrocarbon liquid additive, but when high proportions of hydrocarbon boron constituent are used, an inert diluent additive can be omitted.

In carrying out the process, ethylene is introduced into a pressurized reaction zone at moderately elevated temperature, which reaction zone contains a liquid medium comprising, as the catalyst components thereof, both aluminum compounds and boron compounds. In addition, as previously mentioned, in numerous embodiments an additional component of the liquid phase can be an added inert hydrocarbon reaction medium liquid. Also, in most instances, the reaction liquid portion includes substantial quantities of olefinic hydrocarbon products engendered by the process. Under the influence of the catalytic system and the reaction conditions involved, the ethylene is converted to alkene hydrocarbons. The composition of the alkene products thus made can be influenced by a variety of factors as is described more fully hereinafter. In general, it is desired to produce an olefinic product having a high overall proportion of vinyl olefins therein, and the factors contributing such a result will be described in more detail below. On the other hand, in some instances, it may be desirable to produce a product having appreciable quantities of vinylidene alpha olefins present, and in such instances, the characteristics of the process can be modified in keeping with the teaching of the present invention.

The particular mode of conducting the reaction is susceptible of much variation. The simplest possible mode of operation involves a batch type of operation, in which ethylene is fed into a closed reaction zone, and the hydrocarbons engendered by the process therein are retained until the completion of a desired operating cycle. On the other hand, in many instances, a continuous, flow type reactor is very advantageously used and is preferred in some instances.

The precise pressure and temperature employed are not highly critical within the broad scope of the invention. On the other hand, as demonstrated more fully below, each of these variables has a significant effect on the course of the reaction and its effectiveness in several respects. Thus, it is preferred in virtually all intsances to provide an operating pressure of above about 700 pounds per square inch, or alternatively above a pressure expressed by the relation $$P = 33.5T - 5400$$

wherein $P$ = pressure in pounds per square inch, and
$T$ = temperature in ° C.

whichever of these two expressed pressures are higher. In other words, if the operating temperature selected results, according to the above expression, in a pressure of, say, 850 pounds per square inch, it is then preferred to operate at a pressure above this level, rather than at a pressure between 700 and 850 pounds per square inch.

The temperatures of operation are relatively elevated, usually above about 140° C., a preferred temperature range being from 170 to about 225° C. In addition to the above described minimum desired pressure for preferred embodiments, in a preferred group of embodiments, the operating pressure does not exceed about 4,000 pounds per square inch, or the pressure given by the expression $$P_{ma} = 60T - 7700$$

wherein $P_{ma}$ = preferred maximum pressure, pounds per square inch, and
$T$ = operating temperature, ° C.

As in the case of the preferred lower pressure, for a given temperature, the maximum limit of the preferred pressure range is determined, for a particular temperature, by ascertaining the maximum pressure, $P_{ma}$, as derived from the operating temperature according to the above expression, and if said pressure is below 4,000 pounds per square inch, it is then considered the controlling upper limit for such preferred embodiments. Pressures above 4,000 pounds per square inch are quite permissible, up to, for example, as high as about 7,000 pounds per square inch.

Although various modes of physically conducting the reaction are possible, as previously mentioned, in virtually all instances vigorous agitation is almost essential, although in appropriate circumstances the agitation can be self-induced, that is, as a result of the flow characteristics of the reactor system employed. In batch or cyclic operation, vigorous mechanically applied agitation, by means of an internal, and, preferably, a turbine type agitator, is highly desirable.

The actual reaction time in a particular embodiment is difficult to express for certain modes of conducting the process. In continuous type embodiments relatively short residence times are frequently employed, of the order of as low as a few minutes up to about 2 hours. In such embodiments the residence time is that corresponding to the average period of retention of liquid products of the reaction within the reaction zone. This process variable is thus more precisely definable in flow type operations conducted in an extended tube type reaction zone. In embodiments of the process employing a batch, cyclic type reaction, the residence time can be, for certain components of the reaction product, as long as the entire cycle time, and for other components of the reaction product, can be of the order of several seconds. The residence time of cyclic operation is, then, the period from start of ethylene feed to discontinuance. Residence periods of 1 to 5 hours are common in the cyclic type operation.

The reacted mixture from the reaction zone can be further processed by a variety of techniques. In many instances, the recovery operations involves air oxidation treatment which converts the catalyst components to oxidized and inactive compounds. The so-treated mixture can then be resolved into certain fractions without undesirable side reactions occurring among the product components.

One highly preferred embodiment of the invention incorporates, in conjunction with the above desired catalyzed conversion of ethylene, an improved and novel purification and recovery procedure. According to such embodiments, the reactor effluent is reacted with water, and the hydrocarbon aluminum components are selectively converted to aluminum hydrate, the hydrocarbon radicals being converted to alkane hydrocarbons. The treated mixture is stratified, and the aluminum hydrate or hydroxide, slurried in excess water, is separated from a "hydrocarbon" layer including the olefinic products of the reaction and unreacted boron compounds. The hydrocarbon layer is then fractionated into three portions, viz., an olefin hydrocarbon stream of compounds of less than twelve carbon atoms, a product fraction of compounds of twelve to sixteen carbon atoms, and a heavy ends fraction of compounds of more than sixteen carbon atoms, plus the hydrocarbon boron components. A large portion of this heavy fraction is recycled to the reaction zone and the valuable boron catalyst component is recovered and reused.

The details of the invention, and of the best mode of carrying out the several embodiments thereof, will be readily understood from the following working examples and from the accompanying figure, which is a schematic illustration of a typical embodiment installation.

Example I

In this operation a reactor was charged with triethyl aluminum, triethyl boron, and pure benzene, the triethyl boron being provided in the mole ratio of about 0.5 per mole of triethyl aluminum and the benzene was provided in sufficient quantity to raise the total of the benzene and triethyl boron to the proportions of 4.88 liters per gram mole of the triethyl aluminum. The reactor was then closed, and heating was initiated, until a temperature of 180° C. was achieved, at which time ethylene was fed to the reactor in such proportions that a pressure of about 2,000 pounds per square inch was maintained. Vigorous agitation was applied to the mixture within the reaction zone during the entire reaction period, which was continued for a residence time of two hours. Reaction occurred steadily and at a good rate during this period. At the conclusion of the reaction period, additional feed of ethylene was discontinued, the reactor and contents were cooled, and excess ethylene was vented off prior to opening.

The liquid reaction mixture was then removed and samples of the crude mixture were analyzed by infrared absorption to ascertain the chemical characteristics of the olefins generated in the process, with respect to the proportions as vinyl olefins and the proportions as vinylidene olefins. It was found that the crude product mixture contained over 95 mole percent vinyl olefins, the remainder being substantially all vinylidene olefins, a small portion of the reaction mixture being alkyl aluminum compounds and alkyl boron compounds derived from the initially charged catalyst component. In addition the reaction mixture included the benzene fed as a diluent. In this reaction, the rate of ethylene take-up was of the order of 95 moles of ethylene per hour per gram mole of triethyl aluminum initially charged.

The product mixture was further treated by subjecting to oxidation, by blowing a stream of dry air through the mixture for a period of 30 minutes, at a temperature of about 45° C. This oxidation treatment converts the alkyl aluminum and the alkyl boron compounds to the corresponding dialkoxide alkyl compounds. It is found that this step terminates catalytic activity so that the product composition is not altered during following separation operations. The so-treated mixture was then resolved, by distillation, into three fractions, comprising $C_{<12}$, $C_{12-16}$, and a higher boiling fraction. The low boiling fraction, or $C_{<12}$ fraction, included, in addition to olefins of 4 to 10 carbon atoms, the benzene diluent. The higher boiling, or $C_{>16}$ fraction, included dialkoxide alkyl compounds of boron, and aluminum as well as olefins of 18 or more carbon atoms. The analysis of the crude product mixture as determined by the described fractional distillation was as follows.

| Fraction: | Weight percent |
|---|---|
| Hydrocarbons, $C_{<12}$ (excluding benzene) | 47.1 |
| Hydrocarbons, $C_{12-16}$ | 22.8 |
| Hydrocarbons, $C_{>16}$, and alkoxide alkyl components | 30.3 |

Correction of the analysis of the gross and individual product fractions, by deleting from the quantity produced, the dialkoxide alkyl aluminum and boron constituents resulted in the following break-down of production of olefinic hydrocarbons as such.

| Fraction: | Weight percent |
|---|---|
| Hydrocarbons, $C_{<12}$ | 54.1 |
| Hydrocarbons, $C_{12-16}$ | 26.0 |
| Hydrocarbons, $C_{>16}$ | 19.9 |

The overall production of olefins, on the basis of the weight of trialkyl aluminum catalyst constituent originally charged was about 50 grams of olefinic products per gram of triethyl aluminum. An appreciably higher total production per unit weight of catalyst was fully feasible under the operating conditions, the operation being discontinued, on a one cycle basis, upon approaching the liquid capacity of the reactor.

The individual concentration of single olefin hydrocarbon compounds was approximately as follows.

| Olefin, No. of carbon atoms: | Weight percent |
|---|---|
| 4 | 8 |
| 6 | 12 |
| 8 | 16 |
| 10 | 18 |
| 12 | 10 |
| 14 | 9 |
| 16 | 7 |
| 18 | 6 |
| 20 | 5 |
| 22 | 4 |
| 24 | 3 |
| 26 | 2 |
| 28 | 1 |

By way of contrast, when the foregoing operation was repeated, except that the catalyst constituent consisted solely of triethyl aluminum in the same proportions as in the preceding example, appreciably different results were obtained as outlined below.

| Fraction: | Weight percent |
|---|---|
| Olefins, $C_{<12}$ | 38.2 |
| Olefins, $C_{12-16}$ | 30 |
| Olefins, $C_{>16}$ | 31.8 |

By contrast of the results of Example I with the above, it is seen that the procedure of Example I resulted in an increase of the proportion of the $C_{12-16}$ olefin fraction of over one-third higher than when no trialkyl boron constituent was present in the reaction mixture. Further, or expressing the improvement in a different manner, the amount of higher olefinic hydrocarbon product constituents, of 18 or more carbon atoms, were reduced approximately one-third by the use of the small amount of boron component in Example I.

As previously indicated, in certain embodiments of the process an inert diluent hydrocarbon is not employed and good results are nevertheless obtained, as is illustrated by the following two examples.

Example II

In this operation, in contrast to the procedure of Example I, the reactor charge initially was solely triethyl aluminum and triethyl boron, the latter components being provided in proportions of about 0.92 liter per gram mole of the triethyl aluminum, corresponding to a molal ratio of 6.5:1. The reactor was sealed and heated to an operating temperature of 150° C. Ethylene pressure was then applied and reaction occurred smoothly at a pressure of 900 pounds per square inch. The reaction proceeded relatively uniformly for a reaction period of about 6 hours, the reaction being accompanied by very vigorous agitation of the reactor contents.

At the termination of the reaction period, the ethylene feed was discontinued, and reaction terminated as before. Upon analysis of the product, it was found that a reaction rate of 4.6 moles of ethylene take-up, per mole of triethyl aluminum per hour was experienced. The olefins produced had approximately 95 mole percent vinyl olefins therein, and slightly less than 5 percent of the vinylidene or beta branched olefins.

As a further illustration of embodiments wherein no inert hydrocarbon diluent additive is employed, the following example is illustrative, and shows also operation wherein the relative proportions of the hydrocarbon boron compound are appreciably lower than in Example II.

*Example III*

The procedure of Example II above was repeated, except that in this instance the catalyst system consisted of 20 volumetric parts of trihexyl boron for 10 parts of triethyl aluminum, this corresponding to approximately 270 milliliters of the boron component per gram mole of the triethyl aluminum. This catalyst mixture corresponds to approximately 0.8 mole of trihexyl boron per mole of triethyl aluminum. In carrying out the reaction in the same manner at 150° C. and an operating pressure of 900 pounds per square inch, a reaction rate of approximately three times the rate experienced in Example II was encountered, but in this operation the total quantity of the triethyl aluminum was also about 3 times the proportion in the preceding example. A good product composition was obtained, having approximately 88 percent vinyl olefins, and 12 percent vinylidene olefins, the distribution or proportions of the several fractions being about the same as Example II.

As previously indicated variations in pressure and in temperature have definite effects on the rapidity and the course of the reaction involved in the process, as illustrated in the following example.

*Example IV*

The procedure of Example I was repeated, with the changes that the proportion of the triethyl boron was reduced to approximately 0.3 mole per mole of the triethyl aluminum. The quantity of benzene, however, was maintained constant, so that the total of the benzene and triethylboron, relative to the triethyl aluminum, was in the proportions of about 4.85 liters per gram mole of the triethyl aluminum. In addition, the operating conditions were revised to a temperature of 190° C. and an operating pressure of 3,000 pounds per square inch gauge. Under these conditions, the rate of reaction, in a reaction period of 3 hours, is approximately 1.6 times the overall rate of reaction in Example I. The degree of vinyl olefins produced is approximately the same as well as the relative distribution of the several fractions of the product.

*Example V*

The procedure of Example I is again followed, but in this instance the proportion of triethyl boron is drastically increased to a molar ratio of 9.5 moles per mole of triethyl aluminum, and no benzene or other diluent is employed. In addition the temperature and pressure are reduced, respectively, to 140° C. and about 800 pounds per square inch. The reaction rate is appreciably below the rate encountered with the conditions of Example I, but a high vinyl content product, containing over 95 mole percent vinyl components, is produced.

In contrast when the same operation was conducted, but with no hydrocarbon boron compound catalyst component present, the vinyl content of the product was only about 78 mole percent. In addition, the presence of the boron component results in a lower proportion of the $C_{\geq 16}$ olefin product fraction.

As previously indicated, it is not absolutely essential to the purposes of the invention that the catalyst components be originally provided as trialkyl compounds. Dialkyl boron hydrides or boranes, and dialkyl aluminum hydride compounds are also satisfactory initial catalyst components, which are rapidly converted under the conditions of operation to the corresponding or similar trialkyl compounds. Such modifications are illustrated in the following example.

*Example VI*

The procedure of Example I is repeated, except that diethyl borane and triethyl aluminum are the catalyst components. The molar ratio is as in the preceding example, and similar performance results are achieved.

*Example VII*

When the triethyl aluminum employed in Example I is replaced, as an initial component, by diethyl aluminum hydride, and the boron component is diethyl borane, similar results are nevertheless achieved.

Additional examples of suitable pairs of catalyst components, which can be substituted as desired in the foregoing Examples I–VII, are as follows, tripropyl boron and tripropyl aluminum, tributyl boron and triethyl aluminum, triethyl boron and triisobutyl aluminum, trioctyl boron and trihexyl aluminum. The particular identity of the hydrocarbon radical, as is clear from the preceding examples, is not highly critical. Branched radicals, i.e., 2-methyl-butyl, isobutyl, can be present and the catalyst constituents will be fully effective. The mechanism of the catalysis is not fully understood, but it does appear that the catalyst components experience a change in composition, as the catalysts after a cyclic reaction have appreciably different molecular weight than the catalyst constituents as charged. Hence, it is undesirable to employ catalyst components having cyclic hydrocarbon radical substituents, as such substituents are frequently converted into hydrocarbons which appear as impurities in the product. On the other hand, the process is characterized by production of 50 to 200 fold, or thereabouts, parts of product per part of catalyst, so that impurities desired from the initial catalyst components will not be particularly large in proportion.

As already mentioned, agents can be present in the reactor solution which tend to complex with the hydrocarbon aluminum or the hydrocarbon boron constituents. Such materials include, for example, sodium hydride and lithium hydride, and certain alkali metal halides. Generally however, since the effectiveness of the reaction depends on a mutual effect of the aluminum and the boron constitutents, extraneous complexing compounds tend to interfere and decrease the efficiency of the process.

A further particular advantage of the present process in addition to the general improvement in product quality and in reduction of high molecular weight components therein, is occasioned by the difference in reactivity of alkyl boron compounds as contrasted with alkyl aluminum compounds. Particularly with respect to hydrolysis, the alkyl boron constituents are virtually non-reactive with water, whereas the alkyl aluminum compounds rapidly and readily hydrolyze, yielding separable aluminum hydroxide and alkane hydrocarbons corresponding to the alkyl groups of the aluminum component. This difference in reactivity is utilized to great advantage in a particularly preferred embodiment. In such embodiments the crude product mixture is treated with water, for selective hydrolysis of the alkyl aluminum components. Following the hydrolysis, the resulting aluminum hydrate, along with the excess aqueous reagent, is settled and removed. The organic layer is withdrawn, and separated by appropriate fractionation to a light or high volatility fraction, an intermediate volatility, and a heavy ends fraction. The boron components are principally concentrated in said heavy fraction, which can be recycled at least in part, to the reaction zone for further effective use of the boron alkyl catalyst constituent.

A typical plant layout highly suitable for the above described preferred embodiment is illustrated by the accompanying figure. Referring to the figure, the principal units of a plant installation include a reactor 11, a hydrolyzing reactor 21, a settler 31, and fractionating columns 41, 51. The reactor may be any of several types. Customarily, provision is made for vigorous agitation by, for example, an externally driven agitator assembly 12. Feed conduits to the reactor include an ethylene feed line 13, an alkyl aluminum catalyst component feed line 14, and an alkyl boron make-up catalyst feed line 15. In addition, a recycle line 16 provides for return to the reaction zone of a stream having a substantial quantity of higher alkyl boron constituents therein, plus a high concentration of higher hydrocarbon components, corresponding to a portion of those engendered in the reaction and by-product alkane hydrocarbons resulting from the recovery operation. A transfer line 17 is provided to pass reactor solution to a hydrolyzing reactor 21. A line 22 to the hydrolyzing reactor 21, provides for feed of water thereto. A transfer line 23 passes the treated mixture to a settler 31.

The settler 31 provides sufficient residence time to that an aqueous phase, and flocculent aluminum hydrate, formed in the hydrolysis operation, can settle out of and stratify the remaining portion of the two phase stream. A draw-off line 32 provides for discharge of the aqueous phase and flocculent aluminum hydrate. A transfer line 33 is provided for movement of the organic phase to a first fractionator 41. The first fractionator 41 makes a separation between a low volatility cut, containing, in typical embodiments, hydrocarbons of 18 or more carbon atoms plus the preponderance of the alkyl boron catalyst constituents, as a bottoms stream which is discharged through line 42. An overhead line 43 transfers the less volatile components, including hydrocarbons of 16 and less carbon atoms, to a final fractionator 51. The final fractionator makes a split between a desired product fraction, including hydrocarbons of from 12 to 16 carbon atoms, which is discharged through a bottoms product line 52, a relatively volatile overhead stream being discharged through overhead line 53.

The low volatility, or "heavy ends" fraction from the first fractionator 41 is split into a discard portion, which is discharged through a residue discharge line 43, the bulk of this stream, however, being returned through line 16 to the reactor 11.

To illustrate a typical operation of a perferred embodiment employing the apparatus illustrated by the figure, the following example is illustrative.

*Example VIII*

In this operation the reactor 11 is maintained at a reaction temperature of 180° C. and at an operating pressure of 2,000 pounds per square inch. A recycle stream is fed through line 16, containing approximately 90 to 95 weight percent higher olefin components, of at least about 18 carbon atoms. In addition, this stream contains approximately 1.4 weight percent of alkyl boron compounds, corresponding generally in alkyl substituents of an average length of 10 carbon atoms. In addition to this recycle stream, ethylene is fed through line 13 in the proportions of about one part by weight to about 1.9 parts by weight of the recycle stream fed through line 16. The ethylene feed also corresponds to approximately 155 times the weight of an aluminum alkyl catalyst fed through line 14, the catalyst being triethyl aluminum. A small amount of triethyl boron is fed as a make-up catalyst component to line 15, in the proportions of approximately 0.1 mole per mole of the triethyl aluminum. In addition, in this embodiment, benzene is fed in the proportions of about 3700 parts per 100 parts of triethyl aluminum charged.

During the course of the reaction in the reactor 11, the ethylene is smoothly and rapidly converted to olefin product components, and in addition, a relatively small amount is reacted with the catalyst, increasing the molecular weight thereof. A typical composition of the reaction product stream delivered from the reactor 11 through the transfer line 17 is as follows:

| | Weight percent |
|---|---|
| Benzene | 7.7 |
| Light hydrocarbons, $C_{<12}$ | 16.9 |
| Product fraction, $C_{12-16}$ | 8.1 |
| Alkyl aluminum compounds | 0.9 |
| Alkyl boron compounds | 0.9 |
| Alkane hydrocarbons, $C_{>16}$ | 2.9 |
| Higher olefins, $C_{16-28}$ | 62.5 |

The product mixture indicated above is fed to the hydrolyzer, and concurrently a relatively small amount of water is fed through line 22, in proportions of approximately 2 stoichiometric equivalents, or about 100 pounds per 500 pounds of alkyl aluminum constituents. In the hydrolyzer, the water selectively reacts with the alkyl aluminum constituents, and converts these to the corresponding quantity of aluminum hydrate, $Al(OH)_3$, and alkane hydrocarbons corresponding to the alkyl groups. The resultant, mixed-phase stream passes through the transfer line 23 to the separator 31, and an aqueous phase, accompanied by the aluminum hydrate, is withdrawn through line 32 for discard. The organic phase is passed through the transfer line 33 to the first fractionator 41. The overhead fraction from the column 41 includes all components which are less volatile than olefin hydrocarbons of 18 or more carbon atoms, and this cut is passed through the overhead line 43 to the final fractionator 51, which removes as a bottoms, product stream, an olefin fraction of consituents of 12 to 16 carbon atoms, having as an accompanying inpurity therein about 2 to 3.5 weight percent of corresponding molecular weight alkane hydrocarbons. This fraction contains a high and acceptable content of vinyl olefins, varying, according to various operating factors from 80 up to well over 95 mole percent vinyl olefins. The overhead fraction contains the olefins of 10 or less carbon atoms plus, in this particular embodiment, the relatively small portion of benzene diluent which is employed.

The bottoms fraction from the fractionator 41, after discharge through the line 42, contains about 94 percent high olefins, above 18 carbon atoms, plus approximately 5 percent alkane hydrocarbons of corresponding molecular weight, these being appreciably higher than is produced per pass through the reactor 11. A split of the bottoms stream in line 42 is made on an approximately 1 to 9 weight ratio, the smaller portion being discarded through line 43 for discard, or for fuel purposes or for other uses.

It is seen that the embodiment of the above example makes possible the continued utilization of the alkyl boron catalyst constituent for nine or ten cycles, thus contributing greatly to the effectiveness of the process. In addition, the higher olefin net production, which is discharged from the process through the line 43, corresponds to a distribution of only about 20 weight percent, whereas, as illustrated in the specification heretofore, in the absence of the boron catalyst constituent, the higher olefins are approximately 50 percent greater than this.

It will be clear from the preceding examples and discussion that the numerous variables involved in the implementation of the present process are individually subject to a wide degree of latitude, and adjustment can frequently be dictated according to the desired result and according to the economics of a particular installation.

As already mentioned, suitable operating temperatures can be in the range of above about 140° C. and up to 225° C. or even higher, a preferred temperature range being from 170 to about 225° C. Increases in temperature have several effects on the course of reaction. Firstly, an increase in temperature greatly increases the rate of ethylene take-up, but tends to also increase the amount of vinylidene olefins resultant in the product made. When the temperature is appreciably above about 190° C., the rate of reaction can be so rapid that control is difficult, and in these instances a diluent hydrocarbon is almost essential, unless extremely effective controlling media, such as a high proportion of interior cooling surfaces, are provided.

As previously discussed, a desirable and preferred range of operating pressure is from about 700 pounds to about 4,000 pounds per square inch, but, also, it will be quite clear that the process is not limited to these pressures, and in certain embodiments, higher pressures will also be quite effective and desirable. Increases in pressure are discovered to have several effects. Firstly, an increase in pressure of about 1,000 pounds per square inch has roughly the same increase in reaction rate as an increase in temperature of about 10° C. or thereabout. On the other hand, such an increase in pressure has a supplemental beneficial result which is not exhibited by an increase in temperature giving an equivalent increase in reaction rate, this benefit being that higher pressures promote the proportion of the ethylene reacted which results in vinyl olefins as product constituents. Thus, it is frequently desirable to accompany an increase in temperature with a substantial increase in pressure, so that the effect on reaction rates of both variables can be taken advantage of, and the effect of temperature increase (with respect to increase of vinylidene olefin formation) is overcome or compensated for by the increase in pressure. By way of example, in a typical embodiment in which a product having 95 or greater mole percent vinyl olefins is obtained at a temperature of 180° C. and 2000 pounds per square inch operating pressure, will result in a conversion of 50 grams of ethylene, illustratively, per gram of alkyl aluminum catalyst component expressed as triethyl aluminum. When the conditions of such operation are change to about 190° C. and 3,000 pounds per square inch, a conversion of 75 grams of ethylene per gram of triethyl aluminum can be experienced in the same time interval, and the proportion of vinyl olefins in the product is preserved at the 95 mole percent level.

Although the customary objective of the process is the production of olefins predominating in vinyl type olefins, it is readily seen that by appropriate adjustment of the operating factors, that the product distribution can be appreciably altered to produce a predominance of vinylidene type olefins if desired. Thus, by operating, say, at a pressure of about 800 pounds per square inch, and a temperature of the order of 190–200° C., a very high proportion of the product olefins will be the vinylidene type. Similarly, the product distribution can be altered. Product characterization is most easily expressed by terms of the "peak" olefin, viz., the olefin which is individually present in the greatest weight concentrations. In most of the examples given above, the peak olefin is 1-decene, which is below the desired, or normally desired, product range of olefin hydrocarbons having from 12 to 16 carbon atoms. However, even with this peak olefin, a high and substantial fraction of the olefin products are of the indicated range. By increasing pressure approximately 1,000 pounds, the peak olefin would be shifted approximately 1 ethylene unit, or, for example, from decene-1 to dodecene-1. The increase in pressure is also normally accompanied by a corresponding increase in the high molecular weight hydrocarbon product fraction, that is the fraction having compounds of over 16 carbon atoms, but the employment of the hydrocarbon boron compounds which is the feature of the present process exerts a highly beneficial effect in minimizing this fraction as indicated by the examples above.

As already discussed above, the diluent hydrocarbon liquid components are optional, but are highly desirable when operating at the higher temperature-pressure combinations of the process. In general, it is preferred to use an inert hydrocarbon diluent as a third component of a reaction liquid system when operating at pressures above about 1,000 pounds, and especially when operating at pressures of the order of 2,000 pounds per square inch or above. As indicated by the examples, benzene is a highly effective diluent material, but the particular identity of a hydrocarbon diluent, when used, is not highly critical. Thus aromatic mixtures can be very efficiently used, as other relatively pure aromatic hydrocarbon compounds, such as toluene, ethyl-benzene, and the like. Aliphatic hydrocarbons can be used with good results, or paraffinic fractions of petroleum.

Having fully described the invention and the best manner of its operation, what is claimed is:

1. The process of manufacture of an alpha olefin hydrocarbon product consisting essentially of olefins of from 4 up to about 30 carbon atoms and predominating in normal alpha olefins, comprising reacting ethylene in the presence of a reaction system including a catalyst consisting of a trialkyl boron component and a trialkyl aluminum component, the boron component being in the proportions of from about one-fourth to ten moles per mole of the aluminum, the reaction being conducted at a temperature of from about 140° C. and 225° C., and at a pressure below about 7,000 and above 700 pounds per square inch or the pressure given by the expression $$P = 33.5T - 5400$$

wherein P is pressure in pounds per square inch and T is temperature in ° C., whichever is higher.

2. The process of manufacture of an alpha olefin hydrocarbon product consisting essentially of olefins of from 4 up to about 30 carbon atoms and predominating in normal alpha olefin components comprising reacting ethylene in the presence of a catalytic reaction medium consisting essentially of a trialkyl boron component and a trialkyl aluminum component, and in the presence of an inert hydrocarbon liquid diluent, the boron component being in the proportions of from about one-half to two moles per mole of the aluminum component and the diluent being provided in proportions of from about 0.1 to 14 liters per gram mole of the aluminum component, the reaction being conducted at a temperature of from about 140 to 225° C. and a pressure below about 7,000 and above 700 pounds per square inch or the pressure corresponding to that given by the expression $$P = 33.5T - 5400$$

wherein P is pressure in pounds per square inch and T is temperature in ° C., whichever is higher.

3. The process of claim 2 further defined in that the hydrocarbon diluent is present in the proportions of from about 0.1 to 5 liters per gram mole of aluminum component.

4. The process of manufacture of an alpha olefin hydrocarbon product consisting essentially of olefins of from 4 up to 30 carbon atoms and predominating in normal alpha olefins comprising reacting ethylene in the presence of a reaction system including a catalyst consisting of a trialkyl boron component and a trialkyl aluminum component, the boron component being provided in the proportions of from about two to ten moles per mole of the aluminum component, the reaction being conducted at a temperature of from about 140 to about 225° C. and a pressure below about 4,000 and above 700 pounds per square inch or the pressure given by the expression $$P = 33.5T - 5400$$

wherein P is pressure in pounds per square inch and T is temperature in ° C., whichever is higher.

5. An improved process for the manufacture of an alpha olefin hydrocarbon product consisting essentially of olefins of from 4 up to about 30 carbon atoms and predominating in normal alpha olefin components, said process comprising (a) reacting ethylene in the presence of a catalyst consisting of a trialkyl aluminum component and a trialkyl boron component, and a hydrocarbon portion, and including a recycle portion as hereafter defined, the boron component being in the proportions of about one-fourth to ten moles per mole of the aluminum, the reaction being conducted at a temperature of from about 140 to about 225° C. and a pressure below 7,000 and above 700 pounds per square inch or the pressure given by the expression $$P = 33.5T - 5400$$

wherein P is pressure in pounds per square inch and T is temperature in ° C., whichever is higher,
(b) treating the product mixture from (a) with water, whereby the aluminum component is selectively reacted with the water and aluminum hydrate and alkane hydrocarbons are formed from said aluminum component,
(c) separating the aluminum hydrate formed by (b) from the mixture, leaving thereby an organic mixture including olefinic hydrocarbons, alkane hydrocarbons, and trialkyl boron compounds,
(d) fractionating the said organic mixture into at least one product portion consisting essentially of hydrocarbons, and a low volatility bottoms portion comprising olefin hydrocarbons and trialkyl boron compounds, and recycling at least a portion of said low volatility bottoms portion to the said reaction.

References Cited in the file of this patent
UNITED STATES PATENTS

| | | |
|---|---|---|
| 2,699,457 | Ziegler et al. | Jan. 11, 1955 |
| 2,871,276 | Eiszner | Jan. 27, 1959 |
| 2,989,573 | Gardner | June 20, 1961 |
| 3,009,972 | Johnson | Nov. 21, 1961 |

OTHER REFERENCES

Hurd: Journal of the American Chemical Society," 70, 2053–55, (1948).

Brown et al.: "Journal of Organic Chemistry," 22, 1136–1138 (1957).

Brown et al.: "J. Am. Chem. Soc.," 81, 6434–37 (1959).